United States Patent [19]

Saito et al.

[11] Patent Number: 5,673,345
[45] Date of Patent: Sep. 30, 1997

[54] PACKAGE WITH OPTICAL WAVEGUIDE MODULE MOUNTED THEREIN

[75] Inventors: Masahide Saito; Shigeru Semura; Shinji Ishikawa; Dai Yui; Hiroo Kanamori, all of Yokohama, Japan

[73] Assignee: Sumitomo Electric Industries, Ltd., Osaka, Japan

[21] Appl. No.: 634,257

[22] Filed: Apr. 18, 1996

[30] Foreign Application Priority Data

Apr. 18, 1995 [JP] Japan ............................. 7-092502

[51] Int. Cl.⁶ ........................................... G02B 6/30
[52] U.S. Cl. ........................... 385/49; 385/50; 385/51; 385/14; 385/129; 385/130; 385/132; 385/134
[58] Field of Search ............................. 385/14, 15, 27, 385/31, 39, 49, 50, 51, 129, 130, 131, 132, 134, 147

[56] References Cited

U.S. PATENT DOCUMENTS

| | | | |
|---|---|---|---|
| 5,015,059 | 5/1991 | Booth et al. | 385/49 X |
| 5,048,919 | 9/1991 | Ladany | 385/49 |
| 5,123,068 | 6/1992 | Hakoun et al. | 385/49 X |
| 5,231,683 | 7/1993 | Hockaday et al. | 385/49 |
| 5,416,881 | 5/1995 | Ikeda | 385/49 X |
| 5,444,804 | 8/1995 | Yui et al. | 385/49 |
| 5,463,708 | 10/1995 | Yui et al. | 385/49 |
| 5,475,784 | 12/1995 | Bookbinder et al. | 385/49 X |
| 5,481,632 | 1/1996 | Hirai et al. | 385/49 |
| 5,482,585 | 1/1996 | Ota et al. | 385/49 X |
| 5,533,156 | 7/1996 | Maxwell et al. | 385/49 |
| 5,559,914 | 9/1996 | Asakura | 385/49 |

FOREIGN PATENT DOCUMENTS

| | | | |
|---|---|---|---|
| 0 422 445 | 4/1991 | European Pat. Off. | 385/49 X |
| 0 583 986 | 2/1994 | European Pat. Off. | 385/49 X |
| 0 631 160 | 12/1994 | European Pat. Off. | 385/49 X |
| 0 636 909 | 2/1995 | European Pat. Off. | 385/49 X |
| 5-27139 | 2/1993 | Japan | 385/49 X |

*Primary Examiner*—Brian Healy
*Attorney, Agent, or Firm*—Cushman Darby & Cushman IP Group of Pillsbury Madison & Sutro, LLP

[57] ABSTRACT

The present invention relates to a package in which an optical waveguide module is mounted, at least having such structure as to reduce influence of expansion or contraction (thermal stress) of a metal housing, caused with a temperature change of the external environment and applied on junction parts between an optical waveguide substrate and members for fixedly supporting tip portions of input and output optical fibers. This package comprises a cavity for housing the whole of the optical waveguide module as covered with a buffer protection material, and a metal housing having through holes for leading the above optical fibers to the outside. Particularly, the optical fibers and the through holes are bonded and secured with a filler having higher airtightness than the buffer protection material and having a lower tensile modulus than a metal material forming the housing.

18 Claims, 7 Drawing Sheets

PACKAGE WITH OPTICAL WAVEGUIDE MODULE MOUNTED THEREIN

BACKGROUND OF THE INVENTION

1. Field of the Invention

The present invention relates to the structure of a package in which an optical waveguide module, utilized for example in branching of optical signal, is mounted.

2. Related Background Art

The technology related to this invention is disclosed, for example, in the bulletin of Japanese Laid-open Patent Application No. 5-27139. This bulletin discloses a basic module (optical waveguide module) comprising a waveguide substrate having a plurality of waveguides, an input-side silicon member bonded to an input-side end face of the waveguide substrate as supporting input optical fibers, and an output-side silicon member bonded to an output-side end face of the waveguide substrate as supporting output optical fibers. The bulletin also discloses the structure in which the basic module is housed in a housing filled with a buffer protection material so as to absorb an impact or the like applied from the outside of the housing.

SUMMARY OF THE INVENTION

The inventors examined the above prior art and found the following problems.

Since the conventional package incorporating the optical waveguide module was constructed as described above, it failed to adequately prevent expansion or contraction of the housing from occurring with a change of the environmental temperature. This caused the input optical fibers and output optical fibers, bonded in part thereof to the housing, to be pulled especially at high temperatures, which resulted in reducing the bond strength of an adhesive (for example, a UV curing adhesive) cementing the silicon members to the waveguide substrate with passage of time, thus increasing losses due to deviation between optical axes. In the cases where the decrease of the bond strength was extreme, the silicon member finally resulted in peeling off from the waveguide substrate.

In order to improve the above circumstances, the material for the housing may conceivably be changed into a glass or a liquid-crystal polymer with a low coefficient of linear expansion. However, the former is weak against an impact. Further, the latter has such a property that it is difficult to process the housing in a small thickness, resulting in failing to achieve compactification of the housing.

Further, it is also conceivable to apply a method for preliminarily bending optical fibers housed inside the housing so as to give an extra length, thereby canceling expansion or contraction of the housing. This method, however, took a lot of time and labor for work, which was not suitable for mass production.

It is, therefore, an object of the present invention to provide a package in which an optical waveguide module is mounted, having such structure as to decrease influence of expansion or contraction (thermal stress) of a metal housing, caused with a change of the temperature of an external environment and applied to bonded portions between support members for fixing and supporting tip portions of optical fibers and an optical waveguide substrate, and as to protect the optical fibers themselves against breakage.

The package according to the present invention comprises, as shown in FIG. 1, a metal housing 10 for housing the whole of an optical waveguide module 200 inside a cavity 100 thereof. Here, the optical waveguide module 200 comprises a first support member 202a for supporting the tip of a first optical fiber 301A, a second support member 203a for supporting the tip of a second optical fiber 301B, and a waveguide substrate 201 disposed between the first and second support members 202a, 203a, in which a waveguide for propagating at least light emergent from the first optical fiber 301A and incident into the second optical fiber 301B is built. Particularly, a first end face 201a of the waveguide substrate 201 is fixed with a predetermined adhesive 150 to an end face 202c of the first support member in a facing state, while a second end face 201b of the waveguide substrate 201 is fixed with a predetermined adhesive 151 to an end face 203c of the second support member in a facing state. This optically couples the first optical fiber 301A with the second optical fiber 301B through the waveguide built in the waveguide substrate 201 (see FIG. 10).

In this specification the "optical fiber" is used as a notion including a single transmission line 301A and a plurality of transmission lines 301B, each consisting of a core in which light of a predetermined wavelength propagates, and a cladding covering the core and having a lower refractive index than the core, as shown in FIG. 1.

Further, the inside of the cavity 100 of the above metal housing 10 is filled with a buffer protection material 400 for covering the whole of the optical waveguide module 200 and protecting the optical waveguide module 200 against external stress. This metal housing 10 comprises a first projecting portion 11A extending along a direction perpendicular to the external wall of the housing 10 and having a through hole 110A for leading the first optical fiber 301A from inside the cavity 100 to the outside of the housing 10, and a second projecting portion 11B disposed at a position opposite to the first projecting portion 11A, extending along the direction perpendicular to the external wall of the housing 10, and having a through hole 110B for leading the second optical fiber 301B from inside the cavity 100 to the outside of the housing 10.

In particular, the package in which the optical waveguide module is mounted, according to the present invention, has a first filler 113A, which is a filler for filling a space in the through hole 110A in the above first projecting portion 11A, which has higher airtightness than the buffer protection material 400, and which has a lower tensile modulus than a metal material forming the housing 10, and a second filler 113B, which is a filler for filling a space inside the through hole 110B in the second projecting portion 11B, which has higher airtightness than the buffer protection material 400, and which has a lower tensile modulus than the metal material forming the housing 10, as shown in FIG. 6, 9, or 11.

Specifically, results of experiments by the inventors showed that effective tensile moduli of these first and second fillers 11A, 11B each are not less than 0.1 kgf/mm² and not more than 100 kgf/mm². Further, the tensile moduli of these first and second fillers each are preferably not less than 1 kgf/mm² and not more than 10 kgf/mm².

As a structure for preventing breakage of the above first and second optical fibers 301A, 301B themselves, the package according to the present invention has a first flexible protection tube 12A a part of which is fixed to the first projecting portion 11A and which has a through hole 122A through which the first optical fiber 301A is set, and a second flexible protection tube 12B a part of which is fixed to the second projecting portion 11B and which has a through hole 122B through which the second optical fiber 301B is set, as shown in FIG. 6 or 9. The first filler 113A is packed in a space inside the through hole 122A of the first protection tube 12A, and the second filler 113B is packed in a space inside the through hole 122B of the second protection tube 12B.

Further, the package according to the present invention comprises a first rubber sleeve 13A having a through hole 130A through which the first optical fiber 301A is set and covering the first projecting portion 11A as housing the whole of the first protection tube 12A, and a second rubber sleeve 13B having a through hole 130B through which the second optical fiber 301B is set and covering the second projecting portion 11B as housing the whole of the second protection tube 12B.

Since the package according to the present invention is weak against the external stress at the junction part between the support member of the first optical fiber 301A (the first support member 202a) and the waveguide substrate 202 and at the junction part between the waveguide substrate 201 and the support member of the second optical fiber 301B (the second support member 203a), these junction parts are protected against the external stress by covering the junction parts with the relatively soft buffer protection material such as a silicone gum.

By setting the moduli of the first and second fillers 113A, 113B for fixing the input optical fiber cable 300A (having the first optical fiber 301A) in the first projecting portion 11A through which the input optical fiber cable 300A is set and for fixing the output optical fiber cable 300B (including the second optical fiber 301B) in the second projecting portion 11B through which the output optical fiber cable 300B is set, to be 100 or less kgf/mm$^2$ and setting the moduli smaller than that of the metal housing, tensile force on each input or output optical fiber cable 300A, 300B, occurring because of expansion of the housing itself, is reduced even when the entire package is placed under a high-temperature environment.

By setting the moduli of the first and second fillers 113A, 113B for fixing the input optical fiber cable 300A in the first projecting portion 11A and for fixing the output optical fiber cable 300B in the second projecting portion 11B, to be 0.1 or more kgf/mm$^2$, the junction parts between the waveguide substrate 201 and each support member 202a, 203a are protected against the external force (tension) exerted on the input optical fiber cable 300A or on the output optical fiber cable 300B up to the limit at least not causing a problem in practical use (for example, up to about 500 gf).

It is practical from the viewpoint of selection of material that the moduli of the first and second fillers 113A, 113B are not less than 1 kgf/mm$^2$ and not more than 10 kgf/mm$^2$.

This can substantially prevent degradation of the junction parts between the each support member 202a, 203a and the waveguide substrate 201, of course, as well as peeling between the each support member 202a, 203a and the waveguide substrate 201.

Further, because the buffer protection material 400 covers the whole of the first member 202a, the waveguide substrate 201, and the second support member 203a, even when the housing 10 existing outside thereof undergoes thermal expansion, the stress due to this expansion is prevented from being directly exerted on the each support member 202a, 203a and waveguide substrate 201.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

The embodiments of the package in which the optical waveguide module is mounted, according to the present invention, will be explained with reference to FIG. 1 to FIG. 13.

Figure 1:
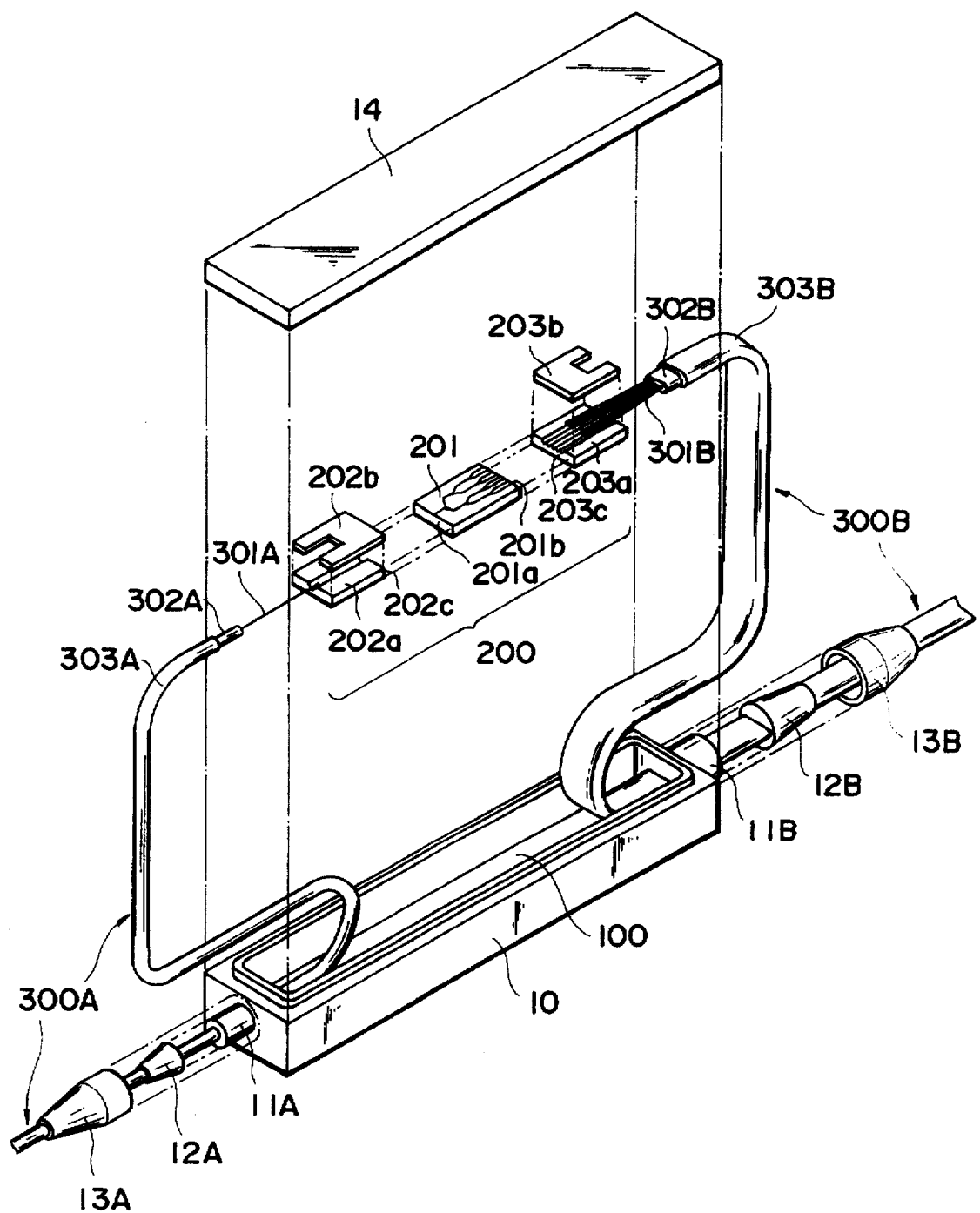
FIG. 1 is a drawing for explaining an assembling process of the package according to the present invention.

FIG. 1 is a drawing for explaining the assembling process of the package in which the optical waveguide module is mounted, according to the present invention. In FIG. 1, an optical waveguide module 200 has a waveguide substrate 201 in which a waveguide is built, and the waveguide receives light of a predetermined wavelength output from an input optical fiber cable 300A (a cable having a single optical fiber 301A) and outputs the light branched or the like to the output optical fiber cable 300B (a tape type cable provided with a plurality of optical fibers 301B). In this specification, the "optical fiber" is described as a notion including a single transmission line (the first optical fiber 301A) and a plurality of transmission lines (the second optical fiber 301B), each consisting of a core for propagating the light of the predetermined wavelength, and a cladding covering the core and having a lower refractive index than the core. In this embodiment, the input optical fiber cable 300A is defined as a single cable composed of the first optical fiber 301A as a single transmission line, a silicone resin coating 302A covering the optical fiber 301A, and a nylon coating 303A further covering the silicone resin coating 302A. Further, the output optical fiber cable 300B is defined as a single cable comprised of the second optical fibers 301B including a plurality of transmission lines, a silicone resin coating 302B totally covering the optical fibers 301B, and a nylon coating 303A further covering the silicone resin coating 302B.

The tip portion of the input optical fiber cable 300A is pinched between a first support member 202a (silicon member) and a first fixing member 202b with a predetermined adhesive to be bonded and fixed to the first support member 202a. As the tip portion of the input optical fiber cable 300A exposes the optical fiber 301A at this time, the optical fiber 301A is set in a V-groove formed in the first support member 202a (silicon member). On the other hand, the tip portion of the output optical fiber cable 300B is also pinched between a second support member 203a (silicon member) and a second fixing member 203b with a predetermined adhesive, thereby being bonded and fixed to the second support member 203a. As the tip portion of the output optical fiber cable 300B exposes a plurality of optical fibers 301B, a corresponding optical fiber among the plurality of optical fibers 301B is set in each of a plurality of V-grooves formed in the second support member 203a (silicon member).

On the input side of the optical waveguide module 200, while the optical fiber 301A faces the input end of the waveguide in the waveguide substrate 201, an input end face 201a of the waveguide substrate 201 is bonded to an end face 202c of the first support member 202a with a predetermined adhesive, whereby the optical fiber 301A and the waveguide in the waveguide substrate 201 are optically coupled with each other. On the other hand, on the output side of the optical waveguide module 200, while the optical fibers 301B face output ends of the associated waveguides in the waveguide substrate 201, an output end face 201b of the waveguide substrate 201 is bonded to an end face 203c of the second support member 203a with a predetermined adhesive, whereby the each optical fiber 301B and the corresponding waveguide in the waveguide substrate 201 are optically coupled with each other.

The housing 10 is made of a metal material, and has a cavity 100 for housing the whole of the optical waveguide module 200, and first and second projecting portions 11A, 11B having respective through holes for making the cavity 100 communicate with the outside of the housing. The input optical fiber cable 300A is set through a through hole formed in the first projecting portion 11A. Further, the input optical fiber cable 300A is set through a through hole of a first flexible protection tube 12A and through a through hole of a first rubber sleeve 13A. Similarly, the output optical fiber cable 300B is set through a through hole formed in the second projecting portion 11B, through a through hole of a second flexible protection tube 12B, and through a through hole of a second rubber sleeve 13B.

The first protection tube 12A is fixed to the first projecting portion 11A in order to prevent the input optical fiber cable 300A from being bent to the extent to cause breakage thereof, and the first sleeve 13A is further fit over the first projecting portion 11A as housing the whole of the first protection tube 12A in order to protect the entire fixing portion between the housing 10 and the input optical fiber cable 300A. Similarly, the second protection tube 12B is fixed to the second projecting portion 11B in order to prevent the output optical fiber cable 300B from being bent to the extent to cause breakage thereof, and the second sleeve 13B is further fit over the second projecting portion 11A as housing the whole of the second protection tube 12B in order to protect the entire fixing portion between the housing 10 and the output optical fiber cable 300B.

Further, an opening portion of the above housing 10 is closed by a metal lid 14 while the optical waveguide module 200 in the above structure is housed in the cavity 100 of the housing 10.

Figure 2:
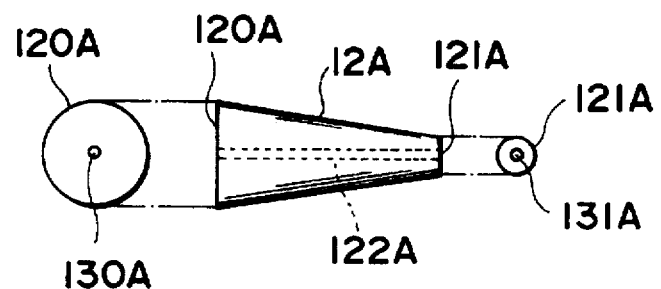
FIG. 2 is a drawing to show the first structure of the flexible protection tube 12A shown in FIG. 1.

The structure of the first and second rubber protection tubes 12A, 12B as described above is next explained using FIG. 2 and FIG. 3. FIG. 2 is a drawing to show the structure of the first protection tube 12A for protecting the input optical fiber cable 300A having the single optical fiber 301A, and FIG. 3 is a drawing to show the structure of the second protection tube 12B for protecting the output optical fiber cable 300B (8-core fiber tape in this embodiment) having the plurality of optical fibers 301B.

As shown in FIG. 2, a first end face 120A of the first protection tube 12A has an approximately same area as an end face 111A of the first projecting portion 11A fixed thereto has. This is for achieving adequate fixing strength. A second end face 121A of the first protection tube 12A has a smaller area than the first end face 120A. By this, the first protection tube 12A is shaped in a tapered form, which functions to prevent the input optical fiber cable 300A from being broken even when the input optical fiber cable 300A is carelessly bent in the direction represented by the arrows D in the drawing shown in FIG. 9. In the present embodiment, the configuration of the cross section of the through hole 122A formed in the first protection tube 12A is circular so as to match with the configuration of the cross section of the input optical fiber cable 300A.

Figure 3:
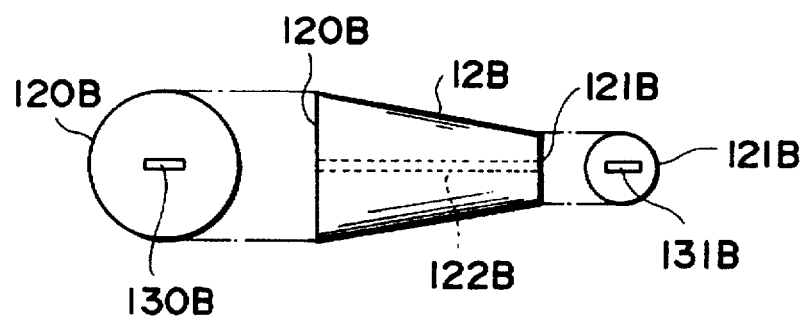
FIG. 3 is a drawing to show the second structure of the flexible protection tube 12B shown in FIG. 1.

Similarly, as shown in FIG. 3, the second protection tube 12B also has a first end face 120B having an approximately same area as an end face 111B of the second projecting portion 11B fixed thereto has, and a second end face 121B having a smaller area than the first end face 120B, as being shaped totally in a tapered form. This second protection tube 12B also has the same function as the above first protection tube 12A. In the present embodiment, the configuration of the cross section of the through hole 122B formed in the second protection tube 12B is of such an elongate shape as to match with the configuration of the cross section of the above output optical fiber cable 300B.

Figure 4:
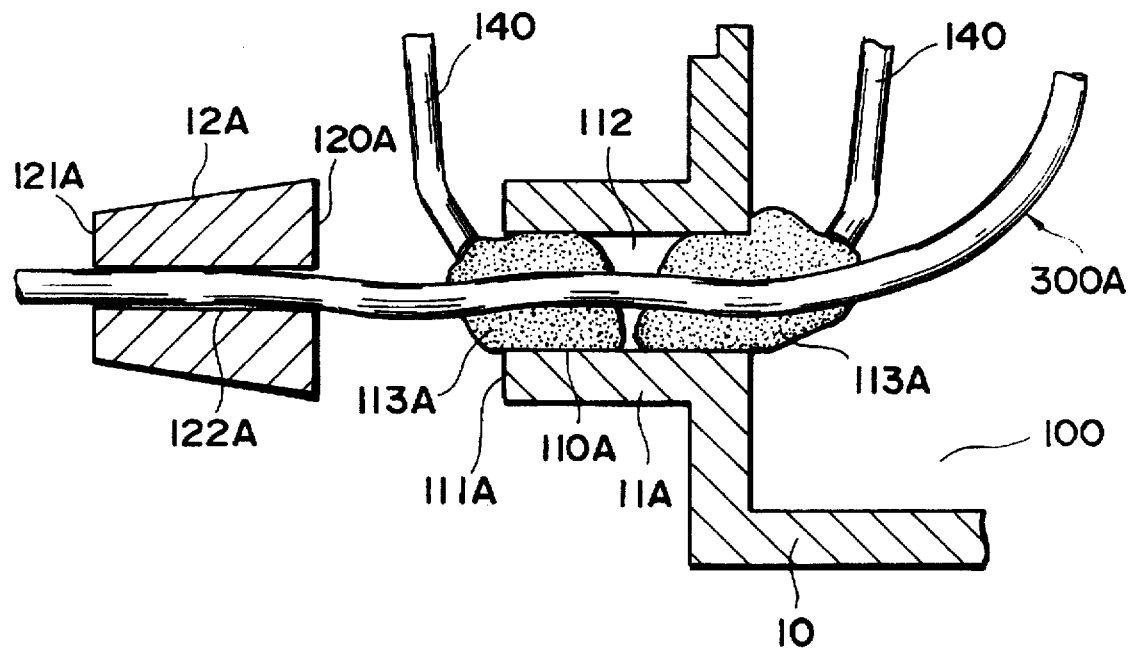
FIG. 4 is a drawing for explaining a first step for filling the filler 113A (113B) in the through hole 110A (110B) in the projecting portion 11A (11B) formed on the external wall of the metal housing 10 shown in FIG. 1.
Figure 5:
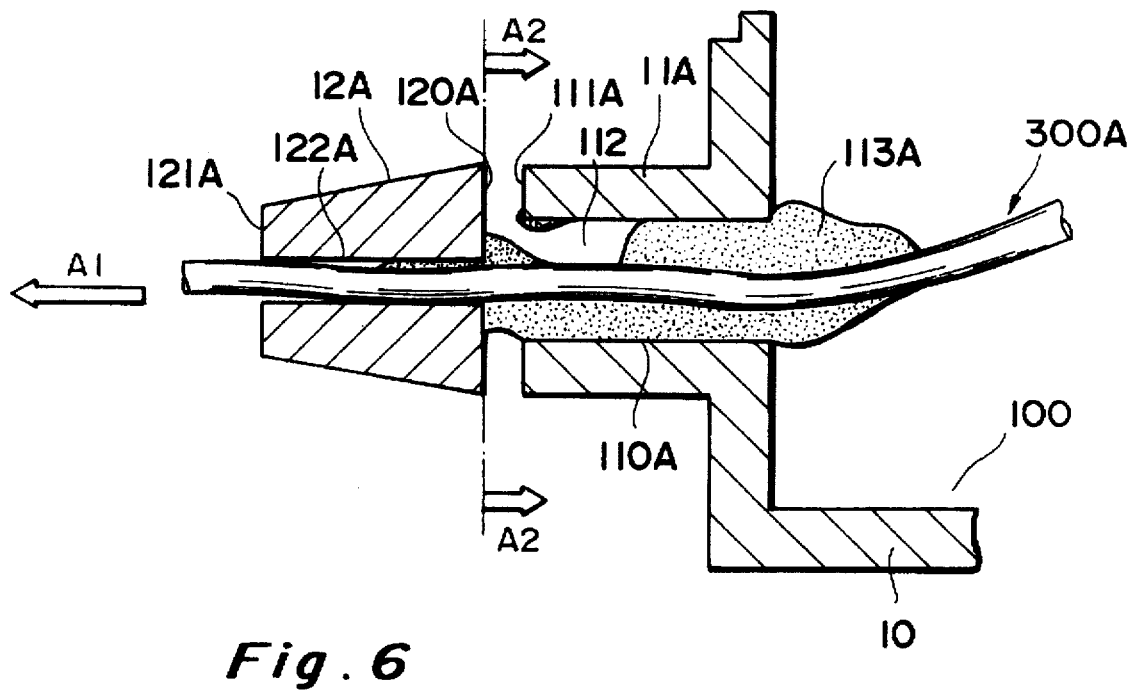
FIG. 5 is a drawing for explaining a second step for filling the filler 113A (113B) in the through hole 110A (110B) in the projecting portion 11A (11B) formed on the external wall of the metal housing 10 shown in FIG. 1.
Figure 6:
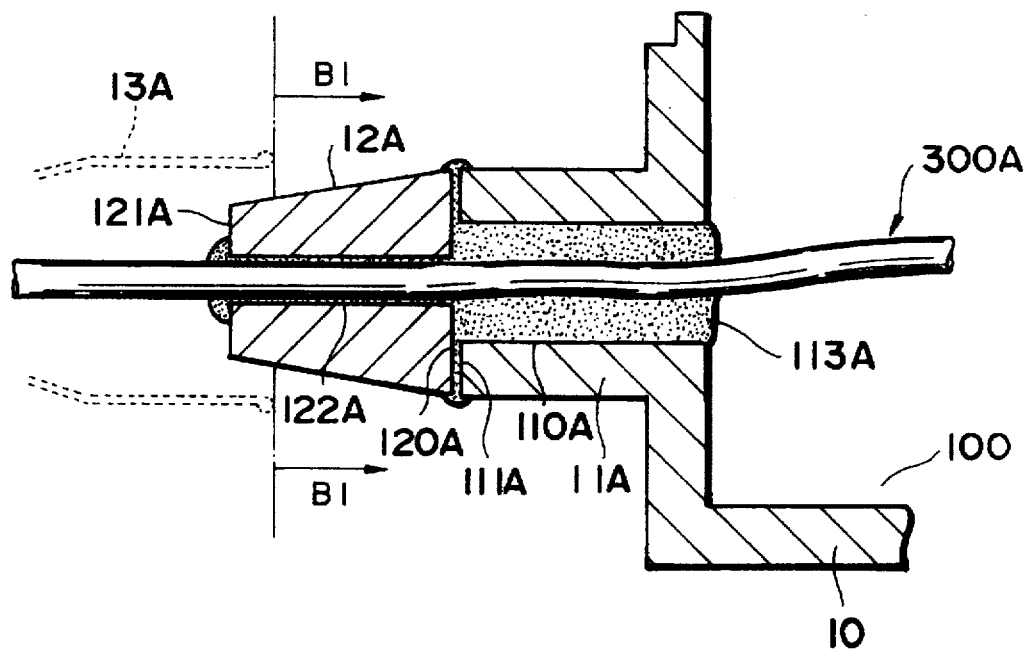
FIG. 6 is a drawing for explaining a third step for filling the filler 113A (113B) in the through hole 110A (110B) in the projecting portion 11A (11B) formed on the external wall of the metal housing 10 shown in FIG. 1.

Next explained using FIG. 4 to FIG. 6 is a method for filling each of the above first and second projecting portions 11A, 11B with first and second fillers 113A, 113B having a predetermined tensile modulus (0.1 kgf/mm² to 100 kgf/mm²). The following explanation describes the assembling process on the side of the first projecting portion 11A, but the assembling process on the side of the second projecting portion 11B is also carried out in the same manner.

First, as shown in FIG. 1, while the input optical fiber cable 300A is set through the through hole 130A of the first sleeve 13A, the through hole 122A of the first protection tube 12A, and the through hole 110A of the first projecting portion 11A and the output optical fiber cable 300B is set through the through hole 130B of the second sleeve 13B, the through hole 122B of the second protection tube 12B, and the through hole 110B of the second projecting portion 11B, the optical waveguide module is assembled. After that, as shown in FIG. 4, the first filler 113A is charged from the side of the cavity 100 and from the outside of the housing 10 through a tube 140 into the through hole 110A of the first projecting portion 11A. Further, the second filler 113B is also charged similarly into the through hole 110B of the second projecting portion 11B.

At the stage after completion of the above step, an air gap 112 is inevitably formed in the through hole 110A formed in the first projecting portion 11A. Thus, as shown in FIG. 5, while pulling the input optical fiber cable 300A in the direction of arrow A1 as shown in the drawing, the next step is carried out to push the first protection tube 12A in the direction of arrow A2 shown in the drawing so as to urge the first end face 120A of the first protection tube 12A against the end face 111A of the first projecting portion 11A. This step can eliminate the air gap 112 inevitably formed in the through hole 110A as described above.

Finally, as shown in FIG. 6, while the first protection tube 12A is fixed to the first projecting portion 11A, the first sleeve 13A is pushed in the direction as shown by arrow B1 in the drawing so as to fit the first sleeve 13A over the first projecting portion 11A. At the stage after completion of the above step shown in FIG. 5, the first filler is charged between the end face 111A of the first projecting portion 11A and the first end face 120A of the first protection tube 12A and in the through hole 122A of the first protection tube 12A.

Figure 7:
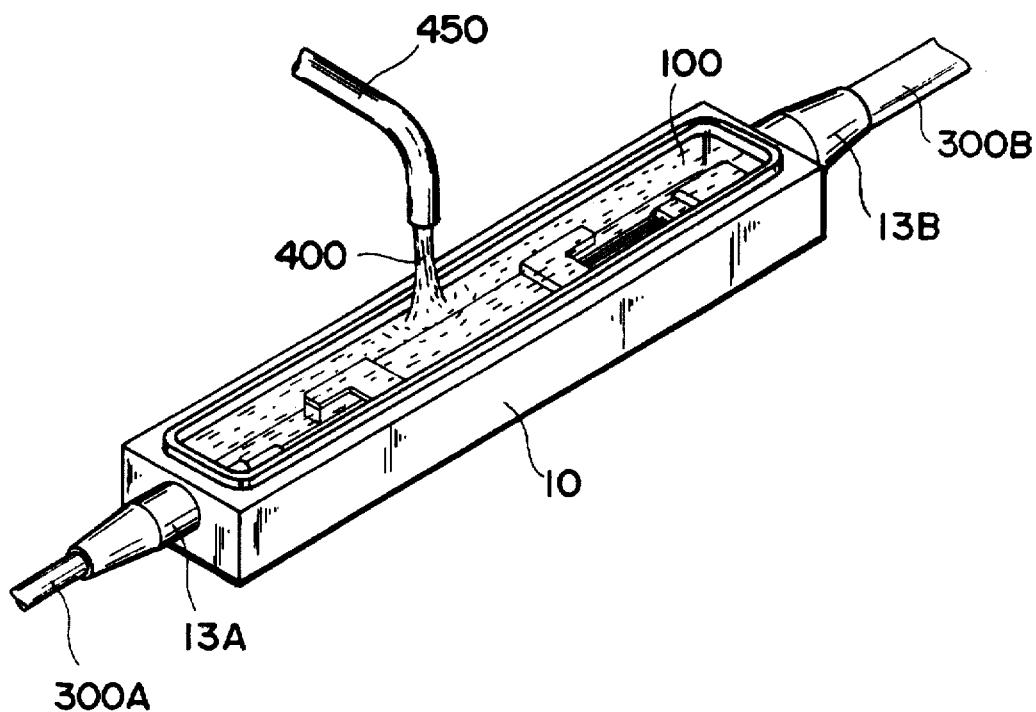
FIG. 7 is a drawing for explaining a step for pouring the buffer protection material 400 into the cavity 100 while the optical waveguide module 200 is housed in the cavity 100 of the metal housing 10 shown in FIG. 1.

By the above steps, the input optical fiber cable 300A and output optical fiber cable 300B are fixed to the metal housing 10 while the entire optical waveguide module 200 is housed in the cavity 100 of the housing 10. Subsequently, as shown in FIG. 7, a buffer protection material 400 is poured into the cavity 100 through a tube 450 and the buffer protection material 400 is cured. Since the cavity 100 of the housing 10 has a sufficient depth for housing the whole of the optical waveguide module 200, the buffer protection material 400 after cured fills inside the cavity 100 as covering the whole of the optical waveguide module 200.

Figure 8:
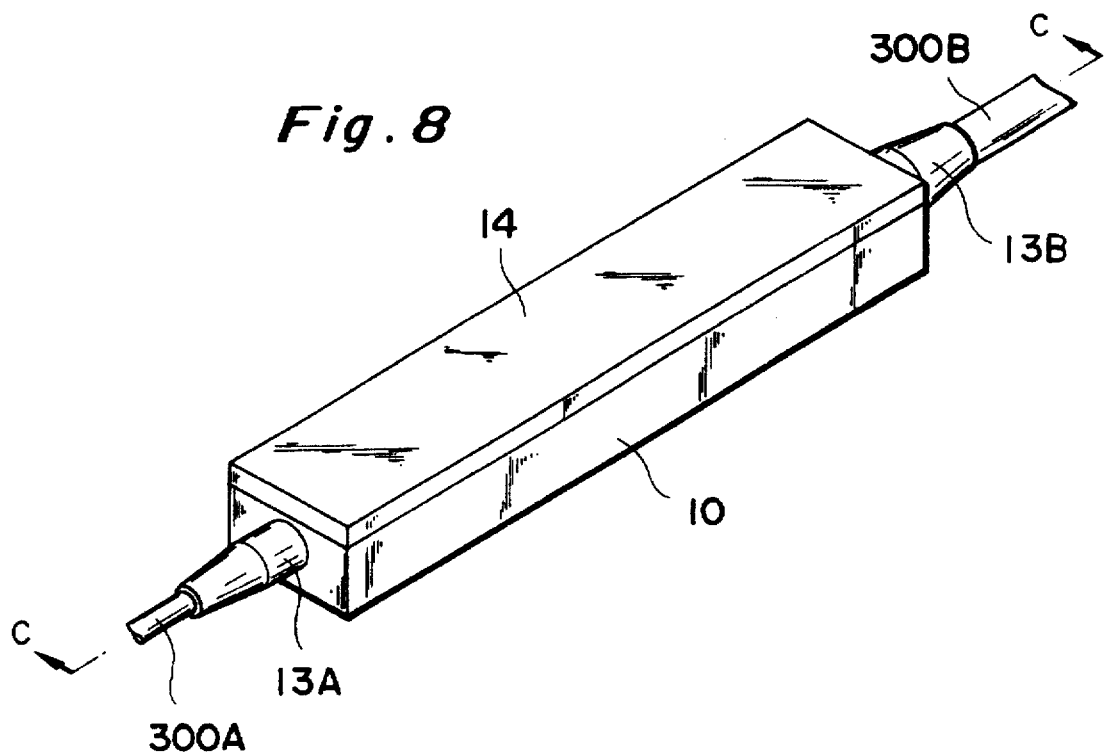
FIG. 8 is a perspective view to show the entire package according to the present invention after the members shown in FIG. 1 are assembled through the steps of FIG. 4 to FIG. 7.

Further, as shown in FIG. 8, the opening portion of the metal housing 10 is closed by the metal lid 14. This seals the optical waveguide module 200 in a space defined by the housing 10 and lid 14 through the buffer protection material 400.

The above buffer protection material 400 is preferably one which is a liquid full of fluidity before cured but changes into a bulk such as a gel having moderate elasticity after cured. In particular, desired properties are as follows: first, the material has excellent fluidity before cured, so as to be capable of being packed into fine portions; second, it is excellent in tackiness and adhesion and has a sealing property and a moisture-proof property; third, it is relatively soft after cured, and it is readily deformed by a small load or pressure; fourth, it has a small modulus of elasticity after cured, and it can relax stress due to thermal expansion or the like; fifth, it has a vibration absorbing property after cured, and so on. The buffer protection material 400 (liquid resin) having such properties is, for example, SILICONE GUM (manufactured by SHINETU SILICONE COMPANY). The material may be a heat curing ultraflexible epoxy resin, XNR-4950 (manufactured by NIPPON CHIBA GAIGI COMPANY), or a two-part mixture curing polyurethane resin, PERU-URETHANE (manufactured by NIPPON PERUNOX CO., LTD).

Further, as an adhesive for bonding the metal housing 10 with the metal lid 14, for example, EPO-TEC 302-3 (manufactured by RIKEI CO., LTD) of an epoxy based adhesive or STAYCAST 2057 (manufactured by GRACE JAPAN CO., LTD) of an epoxy based adhesive was utilized. The above epoxy based resin was also used to bond and fix the first support member 202a and the first fixing member 202b pinching the tip of the input optical fiber cable 300A and to bond and fix the second support member 202a and the second fixing member 203b pinching the tip of the output optical fiber cable 300A. Further, OPTDAIN UV-2100, 3100 (manufactured by DAIKIN KOUGYOU COMPANY) of an epoxy based adhesive was used to bond and fix each end face 201a, 201b of the waveguide substrate 201 with each end face 202c, 203c of the above first or second support member 202a, 203a.

The package in which the optical waveguide module is mounted, according to the present invention, will be explained in further detail.

Figure 9:
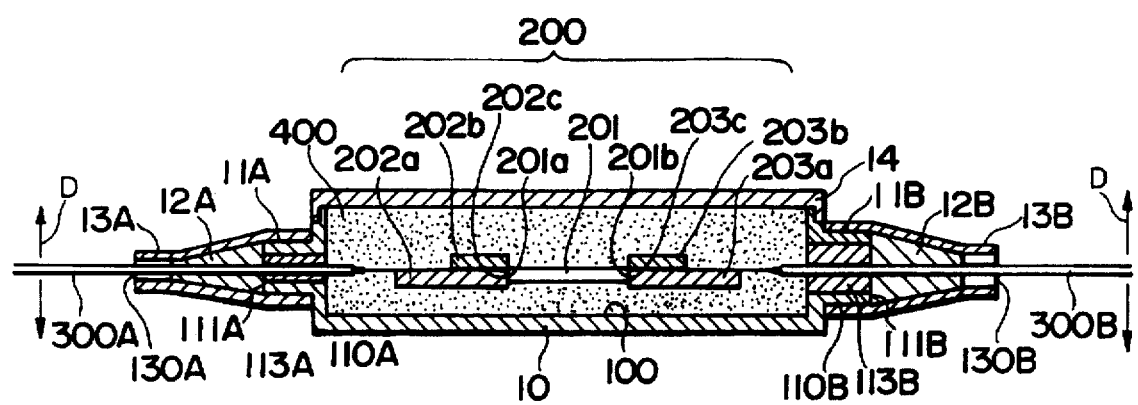
FIG. 9 is a cross-sectional view to show the structure along C—C line, of the package shown in FIG. 8.

FIG. 9 is a cross-sectional view to show the structure along line C—C, of the package of FIG. 8. This package is constructed in such an arrangement that the metal housing 10 houses the V-grooved silicon member 202a (first support member) for supporting and fixing the input optical fiber cable 300A, the waveguide substrate 201 having a plurality of optical waveguides, the V-grooved silicon member 203a (second support member) for supporting and fixing the fiber tape 300B (output optical fiber cable), etc.

The housing 10 is formed of a high-strength stainless steel (for example, SUS304) and has functions to stabilize environment-resistant characteristics and to buffer a mechanical impact. At either end of the housing 10 the first projecting portion 11A having a smaller diameter than the central portion of the housing is formed as projecting therefrom, and the protection tube 12A for protecting the optical fiber is attached to the tip of the projecting portion 11A. The rubber sleeve 13A is fit over the projecting portion 11A as housing the whole of the protection tube 12A.

Figure 10:
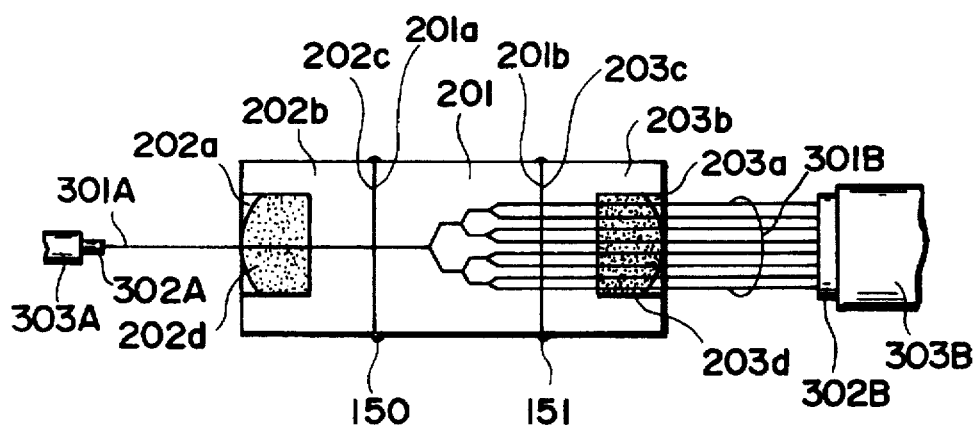
FIG. 10 is a plan view to show the typical structure of the optical waveguide module 200 housed in the metal housing 10 shown in FIG. 1.

FIG. 10 is a plan view to show the total structure of the optical waveguide module 200 housed in the cavity 100 of the metal housing 10. The V-grooved silicon member 202a supports and fixes a single input optical fiber cable or plural input optical fiber cables 300A, and the output-side end face thereof is secured with the UV adhesive (ultraviolet (UV) curing adhesive) 150 to the input-side end face of the waveguide substrate 201 with the optical axes thereof aligned with each other. A lot of optical waveguides for branching a light signal incident from the input optical fiber cable 300A into plural signals are formed in the waveguide substrate 201. In the example as illustrated, the light signal incident is split into eight signals. The V-grooved silicon member 203b is fixed to the waveguide substrate 201 with the adhesive 151, and supports and fixes the 8-core optical fiber 301B optically coupled with the respective optical waveguides in the waveguide substrate 201. The optical fibers 301B compose the 8-core fiber tape 300B (output optical fiber cable). The tip of the input optical fiber cable 300A is formed in such a manner that the optical fiber 301A is pinched through the adhesive 202d by the members 202a, 202b, while the tip of the output optical fiber cable 300B is formed in such a manner that the optical fiber 301B is pinched through the adhesive 203d by the members 203a, 203b. The epoxy resins 113A, 113B with high airtightness secure the input optical fiber cable 300A and the output optical fiber cable 300B to the housing 10 and prevent water from intruding into the housing 10.

Figure 11:
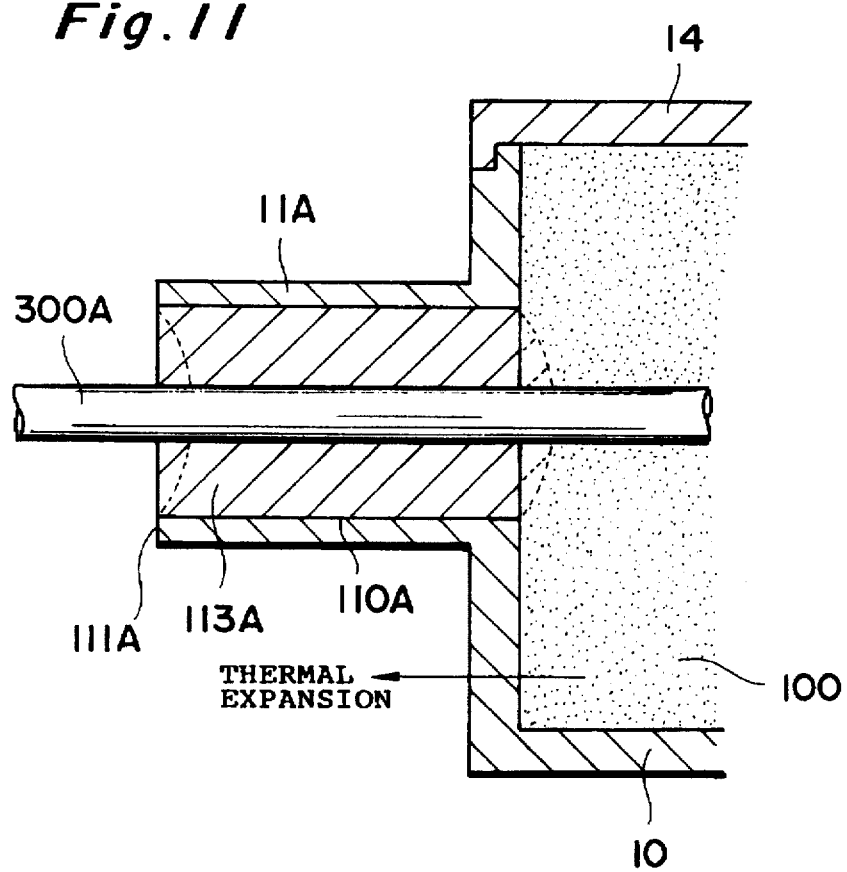
FIG. 11 is a cross-sectional view to show the detailed structure of the projecting portion 11A (11B) shown in FIG. 1, which is coincident with the cross section taken along C—C line in FIG. 8.

FIG. 11 is a cross-sectional view to show the detailed structure of the portion near the projecting portion of the housing 10. FIG. 11 representatively shows the first projecting portion 11A through which the input optical fiber cable 300A passes, but the portion near the second projecting portion 11B through which the output optical fiber cable 300B passes is also constructed in the same structure. As shown in FIG. 11, in the projecting portion 11A the epoxy resin 113A having the tensile modulus being not less than 0.1 kgf/mm$^2$ and not more than 100 kgf/mm$^2$ is filled between the side wall of the through hole 110A of the projecting portion 11A and the input optical fiber cable 300A, whereby the input optical fiber cable 300A is fixed to the projecting portion 11A, that is, to the housing 10.

When the entire package is exposed to a high temperature, the epoxy resin 113A is deformed as shown by dotted lines in FIG. 11 to relax influence of expansion of the housing 10 on the input optical fiber cable 300A.

However, if an epoxy resin with a high modulus were used, the above deformation would be small, which would result in failing to relax the influence of expansion of the housing 10 on the input optical fiber. This would result in tensile stress directly acting on the input optical fiber cable 300A.

Figure 12:
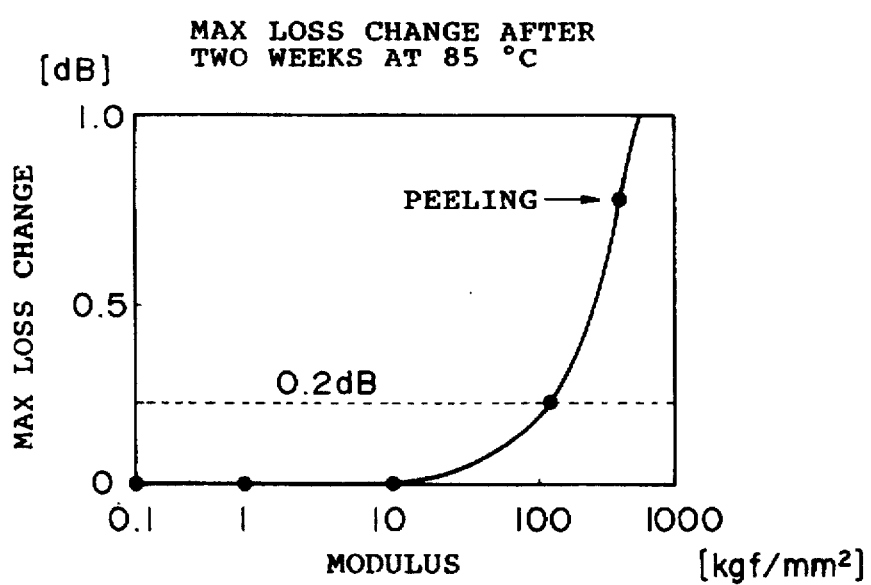
FIG. 12 is a graph to show results of high-temperature environmental tests for plural types of packages in which the optical waveguide module is mounted, wherein the abscissa indicates the moduli of each filler adapted to each package prepared for the tests and the ordinate indicates changes of maximum light loss of each optical waveguide module housed in the cavity of the each package.

FIG. 12 is a graph to show results of measurement in which five packages were prepared with the moduli of the epoxy resin 113A, 113B at five levels between 0.1 and 500 kgf/mm$^2$, the packages were let to stand at the environmental temperature of 85° C. for two weeks, and a maximum loss change of each core (a maximum difference out of differences of transmission losses of cores measured) was measured before and after the test. The optical waveguide modules prepared for this test had the structure shown in FIG. 10, and the packages incorporating the optical waveguide modules had the structure shown in FIG. 9. From FIG. 12, as the modulus of the epoxy resin 113A, 113B increases over the boundary of 100 kgf/mm$^2$, the loss change quickly increases from 0.2 dB. When the modulus was 500 kgf/mm$^2$, peeling was observed between the V-grooved silicon member 202a or the V-grooved silicon member 203a and the waveguide substrate 201. It was thus confirmed that the loss change was able to be kept at the level of 0.2 or less dB to cause no problem in practical use as long as the modulus of the epoxy resin 113A, 113B was 100 or less kgf/mm$^2$.

It is, however, not all to simply decrease the modulus of the epoxy resin 113A, 113B. Namely, it is necessary to take account of the tensile force exerted as external force on the input or output optical fiber cable 300A, 300B. For example, it is expected that the tensile force of at least about 500 gf is exerted on the input or output optical fiber cable 300A, 300B during work to place packages each with the optical waveguide module mounted therein in a further larger container.

Figure 13:
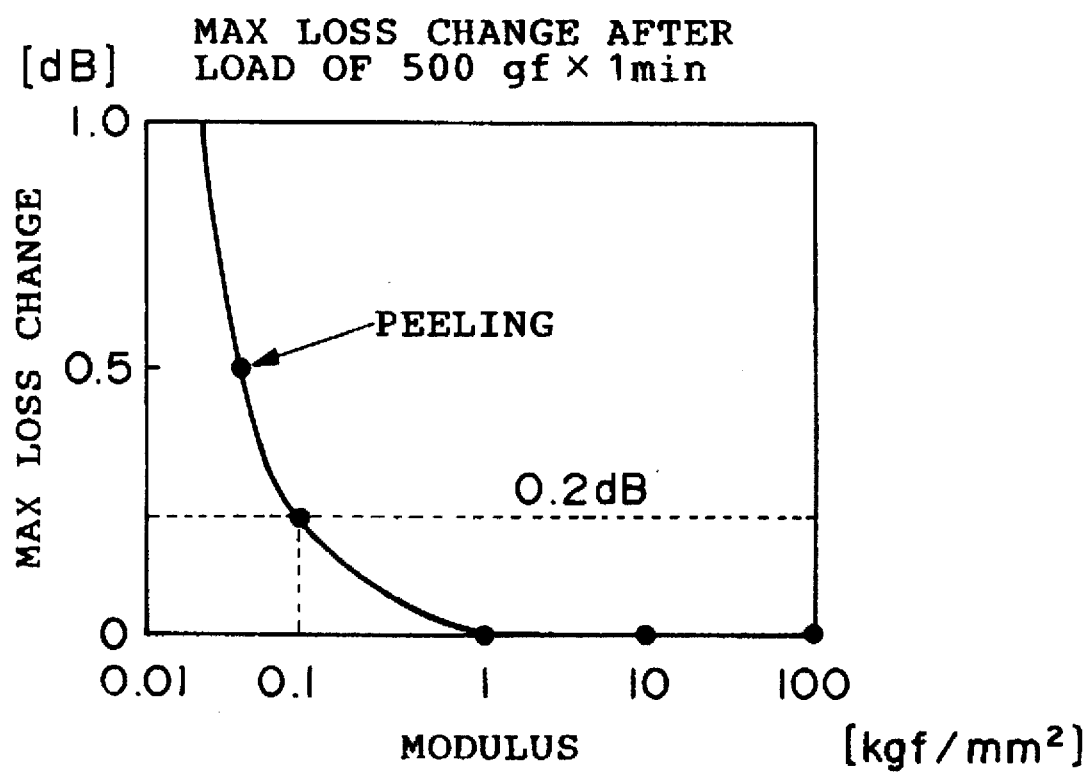
FIG. 13 is a graph to show results of tension tests for plural types of packages in which the optical waveguide module is mounted, wherein the abscissa indicates the moduli of each filler adapted to each package prepared for the tests and the ordinate indicates changes of maximum light loss of each optical waveguide module housed in the cavity of the each package.

FIG. 13 is a graph to show results of measurement in which packages were prepared with the moduli of the epoxy resin 113A, 113B at five levels between 0.05 and 500 kgf/mm$^2$, the tensile force of 500 gf was loaded on each of the input optical fiber cable 300A and the output optical fiber cable 300B for one minute, and a maximum loss change of each core (a maximum difference out of transmission loss differences of cores measured) was measured before and after the test. The optical waveguide modules prepared for this test had the structure shown in FIG. 10, and the packages incorporating the optical waveguide modules had the structure shown in FIG. 9. From FIG. 13, as the modulus of the epoxy resin 113A, 113B decreases beyond the boundary of about 0.1 kgf/mm$^2$, the loss change rapidly increases from 0.2 dB. When the modulus was near 0.07 kgf/mm$^2$, peeling was observed between the V-grooved silicon member 202a or the V-grooved silicon member 203a and the waveguide substrate 201. It was thus confirmed that the loss change was able to be kept at the level of 0.2 or less dB to cause no problem in practical use as long as the modulus of the epoxy resin 113A, 113B was 0.1 or more kgf/mm$^2$.

After the above confirmation, ten samples were prepared of the packages having the structure shown in FIG. 9 and FIG. 10 with the following factors.

| | |
|---|---|
| The material for the housing 10: | SUS 304 |
| The total length of the housing 10: | 70 mm |
| The modulus of the epoxy resin 113A, 113B: | 1.2 kgf/mm$^2$ |
| The coefficient of linear expansion of the epoxy resin 113A, 113B: | 9.2 × 10$^{-5}$ kgf/mm$^2$ |
| The inner diameter of the first and second projecting portions 11A, 11B: | 4.5 mmΦ |
| The length of the first and second projecting portions 11A, 11B: | 3 mm |

These samples were let to stand at the environmental temperature of 85° C. for two weeks, and the maximum loss change of each core was measured before and after the test. As a result, a rate of samples with the maximum loss change being 0.2 or less dB (hereinafter referred to as yield) was 100%. Further, ten samples were also prepared, the tensile force of 500 gf was loaded on each of the input optical fiber cable 300A and the output optical fiber cable 300B for one minute, and the maximum loss change of each core was measured before and after the test. The result of this test was also the yield of 100%.

The following comparative tests were next carried out.

COMPARATIVE EXAMPLE 1

Ten samples were prepared of the packages having the structure shown in FIG. 9 and FIG. 10 with the following factors.

| | |
|---|---|
| The material for the housing 10: | SUS 304 |
| The total length of the housing 10: | 70 mm |
| The modulus of the epoxy resin 113A, 113B: | 140 kgf/mm$^2$ |
| The coefficient of linear expansion of the epoxy resin 113A, 113B: | 2.5 × 10$^{-5}$ kgf/mm$^2$ |
| The inner diameter of the first and second projecting portions 11A, 11B: | 4.5 mmΦ |
| The length of the first and second projecting portions 11A, 11B: | 3 mm |

These samples were let to stand at the environmental temperature of 85° C. for two weeks, and the maximum loss change of each core was measured before and after the test. As a result, the yield was 0%. Further, ten samples were also prepared, the tensile force of 500 gf was loaded on each of the input optical fiber cable 300A and the output optical fiber cable 300B for one minute, and the maximum loss change of each core was measured before and after the test. The result of this test was also the yield of 100%.

COMPARATIVE EXAMPLE 2

Ten samples were prepared of the packages having the structure shown in FIG. 9 and FIG. 10 with the following factors.

| | |
|---|---|
| The material for the housing 10: | SUS 304 |
| The total length of the housing 10: | 70 mm |
| The modulus of the epoxy resin 113A, 113B: | 0.08 kgf/mm$^2$ |
| The coefficient of linear expansion of the epoxy resin 113A, 113B: | $2.6 \times 10^{-6}$ kgf/mm$^2$ |
| The inner diameter of the first and second projecting portions 11A, 11B: | 4.5 mmΦ |
| The length of the first and second projecting portions 11A, 11B: | 3 mm |

These samples were let to stand at the environmental temperature of 85° C. for two weeks, and the maximum loss change of each core was measured before and after the test. As a result, the yield was 100%. Further, ten samples were also prepared, the tensile force of 500 gf was loaded on each of the input optical fiber cable 300A and the output optical fiber cable 300B for one minute, and the maximum loss change of each core was measured before and after the test. The result of this test was also the yield of 0%.

It is noted that the present invention is by no means limited to the above examples, but may have various modifications. For example, the above embodiment showed the example in which the silicone gum was used as the buffer protection material 400 for protecting the bonded portions by the adhesive, but, in addition thereto, the buffer protection material 400 may be either a flexible epoxy, an urethane rubber, or a silicone rubber. The epoxy resin was exemplified as the filler 113A, 113B with higher airtightness than the buffer protection material 400, but, in addition thereto, the flexible epoxy, urethane rubber, or silicone rubber may be used as the filler.

Further, the above embodiment showed the example in which the function of the waveguide substrate 201 was branching of a light signal incident, but there is no specific limitations on the function of the waveguide substrate; for example, it may be switching of optical waveguides.

As detailed above, the package with the optical waveguide module mounted therein according to the present invention employed such structure that the input or output optical fiber support member (first and second support members 202a, 203a) and the waveguide substrate were covered with the buffer protection material for protecting them from the external stress and that the inside of the fiber gripping portions (the first and second projecting portions 11A, 11B) at the both ends of the metal housing was filled with the filler having the higher airtightness than the buffer protection material and having the tensile modulus lower than that of the metal material for the housing, that is, the tensile modulus being not less than 0.1 kgf/mm$^2$ and not more than 100 kgf/mm$^2$.

Accordingly, the stress due to thermal expansion of the metal housing can be relaxed, and the tensile force exerted on the optical fibers used can be reduced to the level not causing a problem in practical use.

As a result, the invention can prevent a drop of bond strength of the UV adhesive due to thermal stress and the invention can provide the structure of the package with the optical waveguide module mounted therein, excellent in environmental resistance and high in reliability.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 092502/1995 (7-092502) filed on Apr. 18, 1995 is hereby incorporated by reference.

What is claimed is:

1. A package comprising:

an optical waveguide module comprising a first support member for supporting a tip of a first optical fiber for propagating light of a predetermined wavelength, and a waveguide substrate in which a waveguide optically coupled with said first optical fiber is built;

a metal housing comprising a cavity for housing the whole of said optical waveguide module, said metal housing comprising a first projecting portion extending along a direction perpendicular to an external wall of the housing and having a through hole for leading said first optical fiber from the cavity of the housing to the outside of the housing;

a buffer protection material housed in the cavity of the housing as covering the whole of said optical waveguide module; and a first filler for filling a space in the through hole of said first projecting portion, said first filler having higher airtightness than said buffer protection material and having a tensile modulus lower than that of a metal material forming said housing.

2. The package according to claim 1, wherein the tensile modulus of said first filler is not less than 0.1 kgf/mm$^2$ and not more than 100 kgf/mm$^2$.

3. The package according to claim 2, wherein the tensile modulus of said first filler is not less than 1 kgf/mm$^2$ and not more than 10 kgf/mm$^2$.

4. The package according to claim 1, further comprising a first flexible protection tube a part of which is fixed to said first projecting portion and which has a through hole through which said first optical fiber is set.

5. The package according to claim 4, wherein said first filler is filled in a space in the through hole of said first protection tube.

6. The package according to claim 4, further comprising a first sleeve which has a through hole through which said first optical fiber is set and which is attached to said first projecting portion as housing the whole of said first protection tube.

7. The package according to claim 1, wherein said optical waveguide module further comprises a second support member for supporting a tip of a second optical fiber optically coupled with said waveguide, said optical waveguide module being located between said first support member and said second support member;

wherein said metal housing further comprises a second projecting portion disposed at a position opposite to said first projecting portion and extending along the direction perpendicular to the external wall of said housing, said second projecting portion having a through hole for leading said second optical fiber from the cavity of the housing to the outside of the housing; and wherein a space in the through hole of said second projecting portion is filled with a second filler having higher airtightness than said buffer protection material and having a tensile modulus lower than that of the metal material forming said housing.

8. The package according to claim 7, wherein the tensile modulus of said second filler is not less than 0.1 kgf/mm$^2$ and not more than 100 kgf/mm$^2$.

9. The package according to claim 8, wherein the tensile modulus of said second filler is not less than 1 kgf/mm$^2$ and not more than 10 kgf/mm$^2$.

10. The package according to claim 7, further comprising a second flexible protection tube a part of which is fixed to said second projecting portion and which has a through hole through which said second optical fiber is set.

11. The package according to claim 10, wherein said second filler is filled in a space in the through hole of said second protection tube.

12. The package according to claim 10, further comprising a second sleeve which has a through hole through which said second optical fiber is set and which is attached to said second projecting portion as housing the whole of said second protection tube.

13. A package comprising:

an optical waveguide module comprising a first support member for supporting a tip of a first optical fiber, a second support member for supporting a tip of a second optical fiber, and a waveguide substrate disposed between said first and second support members, in which a waveguide for propagating at least light to be emergent from said first optical fiber and to be incident to said second optical fiber is built;

a metal housing comprising a cavity for housing the whole of said optical waveguide module, said metal housing comprising a first projecting portion extending along a direction perpendicular to an external wall of said housing and having a through hole for leading said first optical fiber from the inside of the cavity to the outside of the housing, and a second projecting portion disposed at a position opposite to said first projecting portion and extending along the direction perpendicular to the external wall of said housing, said second projecting portion having a through hole for leading said second optical fiber from the inside of the cavity to the outside of the housing;

a buffer protection material housed in the cavity of said housing as covering the whole of said optical waveguide module;

a first filler for filling a space in the through hole of said first projecting portion, said first filler having higher airtightness than said buffer protection material and having a lower tensile modulus than a metal material forming said housing; and a second filler for filling a space in the through hole of said second projecting portion, said second filler having higher airtightness than said buffer protection material and having a lower tensile modulus than the metal material forming said housing.

14. The package according to claim 13, wherein the tensile moduli of said first and second fillers each are not less than 0.1 kgf/mm$^2$ and not more than 100 kgf/mm$^2$.

15. The package according to claim 14, wherein the tensile moduli of said first and second fillers each are not less than 1 kgf/mm$^2$ and not more than 10 kgf/mm$^2$.

16. The package according to claim 13, further comprising:

a first flexible protection tube a part of which is fixed to said first projecting portion and which has a through hole through which said first optical fiber is set, and a second flexible protection tube a part of which is fixed to said second projecting portion and which has a through hole through which said second optical fiber is set.

17. The package according to claim 16, wherein a space in the through hole of said first protection tube is filled with said first filler, and a space in the through hole of said second protection tube is filled with said second filler.

18. The package according to claim 16, further comprising:

a first sleeve having a through hole through which said first optical fiber is set, said first sleeve being attached to said first projecting portion as housing the whole of said first protection tube, and a second sleeve having a through hole through which said second optical fiber is set, said second sleeve being attached to said second projecting portion as housing the whole of said second protection tube.

* * * * *